United States Patent [19]

Kou

[11] Patent Number: 5,590,376
[45] Date of Patent: Dec. 31, 1996

[54] APPARATUS AND METHOD FOR DETECTING AND UPDATING STATUS OF REMOVABLE STORAGE SYSTEM USING SHARED INTERRUPT AND SOFTWARE FLAG

[75] Inventor: James L. T. Kou, Corona, Calif.

[73] Assignee: Toshiba America Information Systems, Inc., Irvine, Calif.

[21] Appl. No.: 974,742

[22] Filed: Nov. 13, 1992

[51] Int. Cl.⁶ .......................... G06F 13/00; G06F 13/10; G06F 13/36
[52] U.S. Cl. .......................... 395/839; 395/838; 395/835
[58] Field of Search ...................... 395/700, 500, 395/835, 836, 838, 839, 837

[56] References Cited

U.S. PATENT DOCUMENTS

| | | |
|---|---|---|
| D. 308,052 | 5/1990 | Darden et al. . |
| D. 311,737 | 10/1990 | Westwood et al. . |
| 4,639,863 | 2/1987 | Harrison et al. ............... 360/97.01 |
| 4,754,397 | 6/1988 | Varaiya et al. . |
| 4,768,149 | 8/1988 | Konopik et al. ............... 395/275 |
| 4,833,554 | 5/1989 | Dalziel et al. . |
| 4,899,342 | 2/1990 | Potter et al. . |
| 4,941,841 | 7/1990 | Darden et al. . |
| 4,960,384 | 10/1990 | Singer et al. . |
| 4,979,054 | 12/1990 | McCullough et al. . |
| 4,982,303 | 1/1991 | Krenz . |
| 4,989,206 | 1/1991 | Dunphy, Jr. et al. . |
| 5,014,237 | 5/1991 | Masters et al. . |
| 5,065,262 | 11/1991 | Blackborow et al. . |
| 5,075,805 | 12/1991 | Peddle et al. . |
| 5,106,322 | 4/1992 | Cesar . |
| 5,297,067 | 3/1994 | Blackborow et al. ........ 364/708.1 |
| 5,307,491 | 4/1994 | Feriozi et al. ............... 395/700 |
| 5,319,751 | 6/1994 | Garney ............... 395/200 |
| 5,327,558 | 7/1994 | Burke et al. ............... 395/650 |

FOREIGN PATENT DOCUMENTS 59-116961  6/1984  Japan .

OTHER PUBLICATIONS

Eggebrecht "Interfacing to the IBM Personal Computer", 1990 pp. 201–203.
Ciarcia, "Ciarcia's Circuit Cellar", 1982 pp. 95–109.
Angermeyer et al. "MS–DOS Developer's Guide" Chapter 5, 1986 pp. 175–212.
Farrell "Understanding device drivers", *Computer Shoppe* Apr. 1994 vol. 44 p. 681(5)–Fulltext copy 14 pages.
Product Brochure "Mega Drive Systems", Mega Drive Systems, Inc.
IBM Technical Reference–Personal Computer Hardware Libary, 1st ed. Sep. 1985. pp. 1–12 to 1–21.
PCMCIA PC Card Standard Release 2.01 1992.

*Primary Examiner*—Thomas O. Lee

[57] ABSTRACT

A system and method for detecting the removal of a removable storage medium from a removable storage media mechanism of a computer environment having set protocols and for obtaining parameter information of a newly inserted removable storage medium in an efficient and flexible manner. Specifically, embodiments of the present invention contemplate that parameter information is obtained only subsequent to detection of the removal of a removable storage medium. This allows removable storage media to be swapped quickly and efficiently and also allows various types of components comprising the removable storage media mechanism to be used.

17 Claims, 12 Drawing Sheets

APPARATUS AND METHOD FOR DETECTING AND UPDATING STATUS OF REMOVABLE STORAGE SYSTEM USING SHARED INTERRUPT AND SOFTWARE FLAG

BACKGROUND OF THE INVENTION

1. Field of the Invention

The present invention relates to a device for detecting the removal of removable storage media such as removable hard disks, removable optical disks, floppy disk drives or the like and for accommodating the replacement of the removed storage media with media of different characteristics (for example, number of sectors, overall storage capacity, etc). More specifically, the present invention relates to a system and method for generating an operating system—detectable signal upon the removal of a removable storage medium from a computer system and for setting a flag readily accessible by the operating system indicating that the storage medium has been removed. Then, when a media operation such as a read or a write is requested, the flag is accessed to ascertain whether the removable storage medium has been removed. If it is determined that a new removable storage medium has been inserted, parameter information is read from the new removable storage medium in order to facilitate the requested media operation. This technique allows a removable storage medium from an existing removable storage media mechanism to be swapped "on the fly" with other storage media of varying sizes.

2. Related Art

Over the past decade, the tremendous popularity of personal and mini computers has spawned a growing demand for removable types of storage media such as floppy disks. This type of media enables users to easily store programs and data on a medium which can be removed and used later on the same or a different computer. In this way, the user is not tied down to using a specific computer. When they first became popular in the late 1970's and early 1980's, floppy disks offered a cheap alternative to hard disks, which in those years were large and expensive. In addition, floppy disks were easier to use than the tape drives or punch cards which were also in widespread use at that time.

At first, the formats for floppy disks had few variations, with one popular standard for a 5¼ inch disk using 40 concentric tracks and having a storage capacity of about 180 kilobytes on each side of the disk. However, over the years, other formats and capacities of disks have evolved. In particular, 5¼ inch 1.2 megabyte floppy disks and 3½ inch 720 kilobyte and 1.44 megabyte floppy disks grew in popularity. Thus, both the 5¼ inch and the 3½ inch floppy disks came in various formats, and disk drives were manufactured which could accommodate the varying formats. However, some way was needed to determine the format of a particular floppy disk when it was inserted and accessed in the disk drive.

One solution to this problem was to read certain information from the floppy disk prior to performing each disk operation. This is the approach taken with most conventional operating systems. More specifically, a "disk handler," which is part of the disk operating system, is loaded into main memory and facilitates disk operations (such as reads and writes). When an application program wishes to perform some disk operation, it typically makes a request to the disk handler to perform that function. Prior to that disk operation taking place, the disk handler (which is often a "block-type device driver") determines whether the disk has been replaced with a disk having a different format since the last disk operation by accessing certain information on the floppy disk. If the floppy disk has been changed in this manner, the disk handler obtains necessary parameter information from the floppy disk so that normal disk operations can then occur. An example of a widely-used disk handler is the one used with the MS-DOS operating systems (developed by Microsoft Corporation of Redmond, Wash.). This disk handler is receptive to certain commands which facilitate disk operations. Thus, application programs wishing to utilize the facilities of the disk handler must use these commands.

One of the commands supported by the MS-DOS disk handler (and by system BIOS's contemplated for use with MS-DOS) is a "media check" command. This command, which is typically executed prior to the commencement of each read or write operation, causes specified information to be read from the boot record of the floppy disk and compared with specified information previously read from the boot record. The results of this comparison indicate whether a floppy disk of differing format has been inserted since the last disk operation.

When a new floppy disk is determined to have been inserted, the "build bios parameter block" command of the MS-DOS disk handler is executed. This command reads the bios parameter block (BPB) of the floppy disk boot record and calculates various information necessary to facilitate disk operations. This information includes the number of disk sectors and the memory capacity of the floppy disk. Once this information is calculated, it is stored in a BPB table in computer memory and is used to facilitate read and write operations.

A further description of the disk handler used by MS-DOS can be found at Chapter 6 of The Waite Group's "MS-DOS Developers Guide" Second Edition, 1989 and also in the MS-DOS reference manual, version 5.0.

The problem with the approach described above for detecting the insertion of new media is that it is slow. Although this is the method that has been used for years, users are demanding faster response times from their computer equipment. Another problem is that most conventional operating systems and disk handlers do not accommodate various newer media forms such as removable hard disks. Often, the entire computer system must be shut off and various switches reset when one removable hard disk is replaced by another, particularly when the two are of different sizes. Even if a disk handler did accommodate a removable hard disk in the same way as for a floppy disk as described above, the access time to determine whether the medium has been removed would be unacceptable to many users, due to the greater complexity of the hard disk. Thus, adding a "hard disk media check" command to the disk handler, by itself, would not be a satisfactory solution.

In response to the problems raised above, some removable media developers have designed systems that employ specially-designed characteristic of the media to determine whether the media has been changed. One example of such a system is manufactured by DiscTec of Winter Park, Fla. and utilizes hard disks each having their own unique special code. This allows a specially-designed disk handler to read the special code to determine whether a new medium has been inserted subsequent to the last disk operation. Although techniques such as this are more efficient than the technique described above for floppy disks, flexibility is compromised since only hard disks having the unique characteristics can be used. In addition, it still requires a significant amount of time to read such special codes, especially if they contain large quantities of information.

Thus, it would be desirable to create a computer storage scheme which allows for the replacement of removable media of various sizes and formats manufactured by various vendors. Ultimately, it would be desirable to allow existing removable media systems (or their equivalents) to receive media of varying sizes from varying vendors and for the removable media to be replaceable with the same ease as replacing a floppy disk. Further, it is also desirable that detection of newly inserted media be executed quickly and without the necessity for the operating system to access and examine the media each time a disk operation is requested.

SUMMARY OF THE INVENTION

The present invention overcomes the deficiencies of prior devices by providing a system and method for detecting the removal of a removable storage medium from a computer system and for allowing the operating system of the computer system to obtain information concerning this removal prior to performing a media operation. Once it is established that the removable storage medium has been removed (and presumably replaced), the removable storage medium is accessed prior to performing a media operation to determine the format of the replacement removable storage medium. This allows the present invention to perform media operations more quickly since the need to access the removable storage medium prior to each media operation is obviated.

The present invention also contemplates utilizing existing protocols and addresses in use by the computer system in order to signal and/or otherwise indicated that a removable storage medium has been removed. In this way, removable storage medium mechanisms and components thereof of various vendors can be used flexibly in conjunction with the present invention (or as in integral part of the present invention). All of this allows removable storage media of various sizes and formats to be flexibly and speedily interchanged with one another.

BRIEF DESCRIPTION OF THE DRAWINGS

Various objects, features, and attendant advantages of the present invention can be more fully appreciated as the same become better understood with reference to the following detailed description of the present invention when considered in connection with the accompanying drawings, in which.

DETAILED DESCRIPTION OF THE PREFERRED EMBODIMENTS

General Overview

The present invention provides flexibility and fast performance by employing a scheme for setting a flag in the memory of a computer system when a removable storage medium has been removed from the computer system. The removable storage medium thus need not be accessed prior to commencing each media operation to determine whether the removable storage medium has been changed since the last media operation. The present invention also allows removable media of various sizes and formats to be interchanged "on the fly" without the need to reboot or manually reconfigure the computer system. In particular, the present invention contemplates a scheme for allowing existing removable media storage mechanisms to communicate with the present invention, thereby allowing these existing removable storage medium mechanisms to accept media of varying formats and storage capacities and to take advantage of the fast response time offered by the present invention.

Figure 1A:
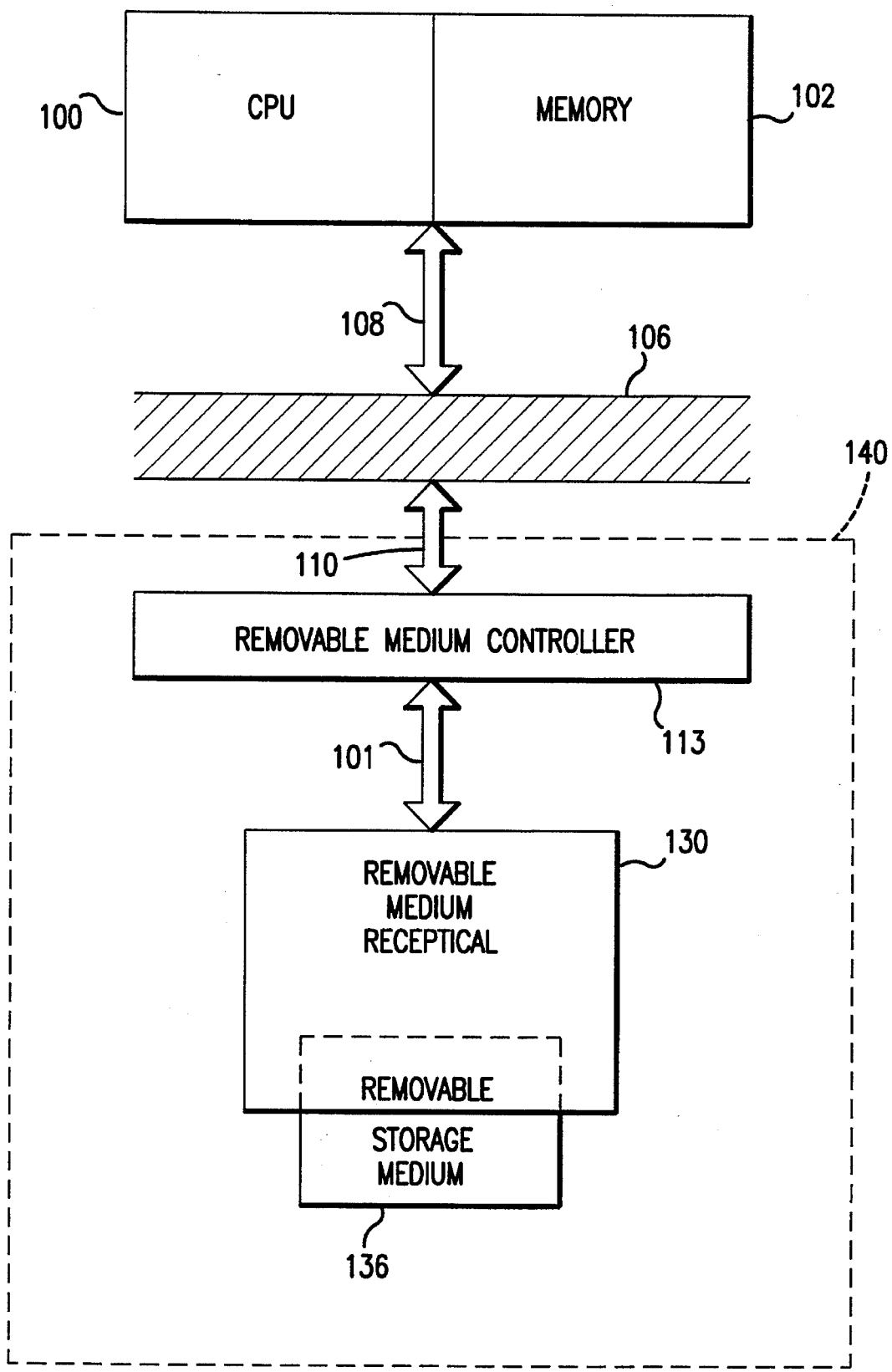
FIG. 1A is a diagram of a computer environment having components of a removable storage medium mechanism.

To better understand the way that the present invention provides the above-noted features, reference is first made to FIG. 1A. This figure shows components of a computer system contemplated for use with and/or as part of the present invention, including components of a conventional removable media storage mechanism.

Referring now to FIG. 1A, the key portions of a typical removable media storage mechanism 140 comprise a removable storage medium 136, a removable medium receptacle 130 and a removable medium controller 113. The removable medium receptacle 130 is shown housing the removable storage medium 136. The removable medium receptacle 130 is in communication with the removable medium controller 113 via a signal line 101. The signal line 101 is used to transfer both data and control signals. These control signals are the mechanism by which removable medium controller 113 communicates with removable medium receptacle 130 (and ultimately with removable storage medium 136).

The form of the control signals used is typically dictated by protocol associated with the operating system (not shown) running processor 100 of the computer system and the type of removable media storage mechanism being used. Examples of different types of removable media storage mechanisms include IDE and SCSI. Typically, only those control signals associated with the protocol being used can be transmitted between removable receptacle 130 and removable medium controller 113.

The removable medium controller 113 is itself in contact with a bus 106 via a signal line 110. The bus 106 is in contact with a processor 100 and memory 102 via a signal line 108. Consequently, when data from the memory 102 is written to the removable storage medium 136 (or vice versa) the data is typically transmitted through all of the devices previously mentioned in conjunction with FIG. 1A.

High-level Embodiments Of The Present Invention

In providing the features of flexibility and speed mentioned above, embodiments of the present invention work in conjunction with existing removable media storage mechanisms by utilizing the protocols existing therein. Specifically, the present invention utilizes a mechanism which is in communication with the removable medium receptacle and removable medium controller and which uses these protocols to convey messages to ascertain the status of a removable medium. Various mechanisms located in memory 102 allow these messages to be processed appropriately. These features can be better described beginning with FIG. 1B.

Figure 1B:
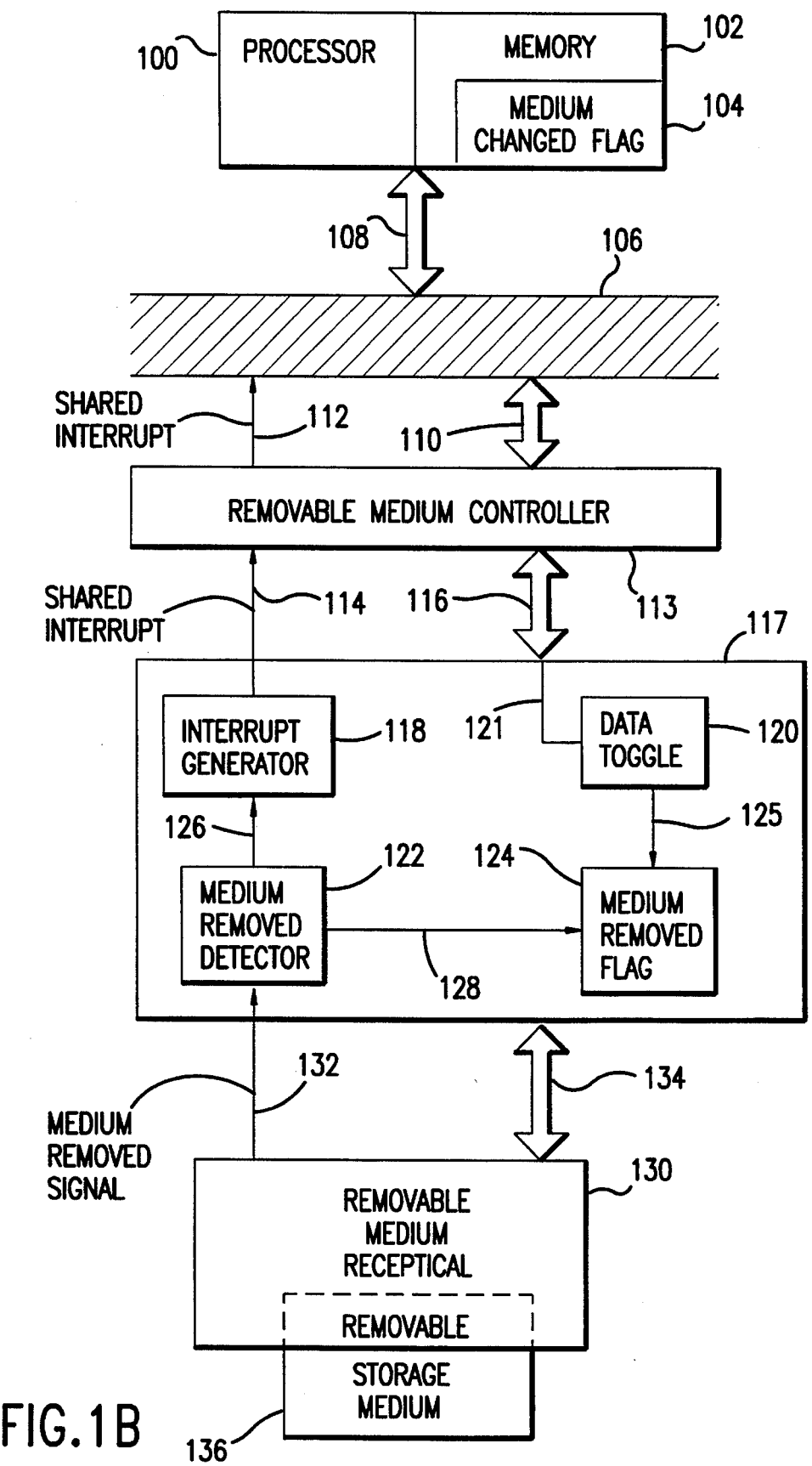
FIG. 1B is a high-level block diagram of a computer environment with a removable storage medium mechanism having components contemplated by various embodiments of the present invention.

Referring now to FIG. 1B, the mechanism which is in communication with the portions of the removable media storage mechanism 140 shown at FIG. 1A is a detection controller 117. Some embodiments of the present invention contemplate that the detection controller 117 is an integral part of the removable media storage mechanism 140 while other embodiments contemplate that the detection controller 117 is a peripheral device which is, in some way, in communication with the removable media storage mechanism 140.

As shown in FIG. 1B, again, removable medium receptacle 130 is shown containing removable storage medium 136. The type of removable media that removable storage medium 136 can be is envisioned to be any number of media types including magnetic hard disks, optical disks, other types of magnetic or optical storage media or any other type of computer information storage device. This includes use in environments where the information on removable storage medium 136 relates to audio and/or visual-related uses.

Embodiments of the present invention contemplate that when removable storage medium 136 is removed from removable medium receptacle 130, a "medium removed signal" is generated by removable medium receptacle 130. The "medium removed signal" is transmitted to the detection controller 117 via a signal line 132. A signal line 134 is used in embodiments of the present invention to transmit other information between removable medium receptacle 130 and detection controller 117. However, it should be understood that other embodiments contemplate that the medium removed signal and the other information can be transmitted across a single signal line.

Medium removed signal line 132 is connected to a medium removed detector 122 within the detection controller 117. Upon detection of the medium removed signal, the medium removed detector 122 sets a medium removed flag 124 via a signal line 128. Thus, when this flag 124 is set, it indicates that the removable storage medium 136 has been removed.

In addition to setting the medium removed flag 124, the medium removed detector 122 also sends a signal to an interrupt generator 118 via a signal line 126. This interrupt generator 118 generates an interrupt to indicate that the removable storage medium 136 has been removed. (An "interrupt" is a control signal which is used to notify processors [which utilize the interrupt methodology] that a particular event has occurred and, if desired, to allow the processor to stop what it is currently doing and "act" on that event. Acting on that event typically entails executing a special interrupt routine.)

In environments contemplated by embodiments of the present invention, control signals such as interrupts transmitted between components of a removable media storage mechanism have defined, predetermined meanings in accordance with some established protocol. Because of this, the interrupt generated by interrupt generator 118 must be one already defined by the protocol being used so that it will recognized by the removable medium controller 113 and/or the computer system generally. Consequently, the use of this interrupt is "shared" between indicating that the removable storage medium 136 has been removed and its originally established meaning. The mechanism contemplated by embodiments of the present invention for discerning the meaning of the generated interrupt will be discussed below.

The shared interrupt from interrupt generator 118 is transmitted via a signal line 114 to the removable medium controller 113. Upon receiving the shared interrupt, the removable medium controller 113 transmits the shared interrupt to bus 106 via signal line 112. The shared interrupt is then transferred to processor 100 via a signal line 108.

Upon receipt of the shared interrupt by processor 100, a determination is made concerning the cause of the interrupt. That is, a determination is made to ascertain whether the interrupt is due to an event relating to its originally established meaning (in accordance with established protocol) or whether the interrupt is due to the removal of the removable storage medium 136. To make this determination, the medium removed flag 124 in detection controller 117 is accessed.

Embodiments of the present invention contemplate that medium removed flag 124 is accessed by processor 100 via some location or "address" (e.g., a port address) established, for example, by the protocol of the particular type of removable media storage mechanism in use. Thus, like the interrupt, this address is "shared." Specifically, the address is shared with the removable media storage mechanism and/or computer system generally. For example, this address may be shared with a pre-existing mechanism associated with the removable medium receptacle 130.

It is not sufficient to merely share an address with a pre-existing mechanism. Specifically, the medium removed flag 124 cannot be accessed without disabling the pre-existing mechanism that normally makes use of that address. Otherwise, data from that pre-existing mechanism will be received rather than data from the medium removed flag 124.

In order to allow the data in medium removed flag 124 to be read at the shared address, a data toggle 120 is used to inhibit any signal from being sent from the pre-existing mechanism normally associated with that address. At the same time, the data from the medium removed flag 124 is made accessible. In this way, the medium removed flag 124 can share an address reserved, by protocol, used by another pre-existing mechanism.

In summary, embodiments of the present invention contemplate that the data within medium removed flag 124 is accessed via signal lines 125, 121 and 116, removable medium controller 113, signal line 110, bus 106 and signal line 108. Some embodiments also contemplate that the data is accessed via data toggle 120 as well. After the data is read from medium removed flag 124, data toggle 120 re-enables the address so that whatever pre-existing mechanism is normally associated with that address can use it again.

If the medium removed flag 124 is determined to have been set, a medium changed flag 104 within memory 102 is then set. In this way, an indication of whether the removable storage medium 136 has been removed is stored in memory 102 so that each time a media operation is requested, the removable storage medium 136 does not have to be checked to determine whether a different removable storage medium 136 has been inserted. Of course, the present invention contemplates use in environments that ensure that some removable storage medium 136 is in removable medium receptacle 130 before allowing a medium operation to take place.

It should be understood that although signal line 114 and signal line 116 are shown as separate in embodiments depicted by FIG. 1B that other embodiments envision that they are part of a single signal line. The same is true for signal line 112 and signal line 110. In addition, embodiments of the present invention also contemplate the use of various other schemes allowing the components of detection controller 117 to communicate with each other and with removable medium controller 113 and removable medium receptacle 130.

In order for embodiments of the present invention to function, certain mechanisms need to exist in the contents of memory 102 so that the medium removed flag 124 can be is set and checked at the appropriate times. Embodiments of the present invention envision that these mechanisms relate to the operating system which run the computer system generally and processor 100 in particular. These mechanisms can be better explained with regard to FIG. 2.

Figure 2:
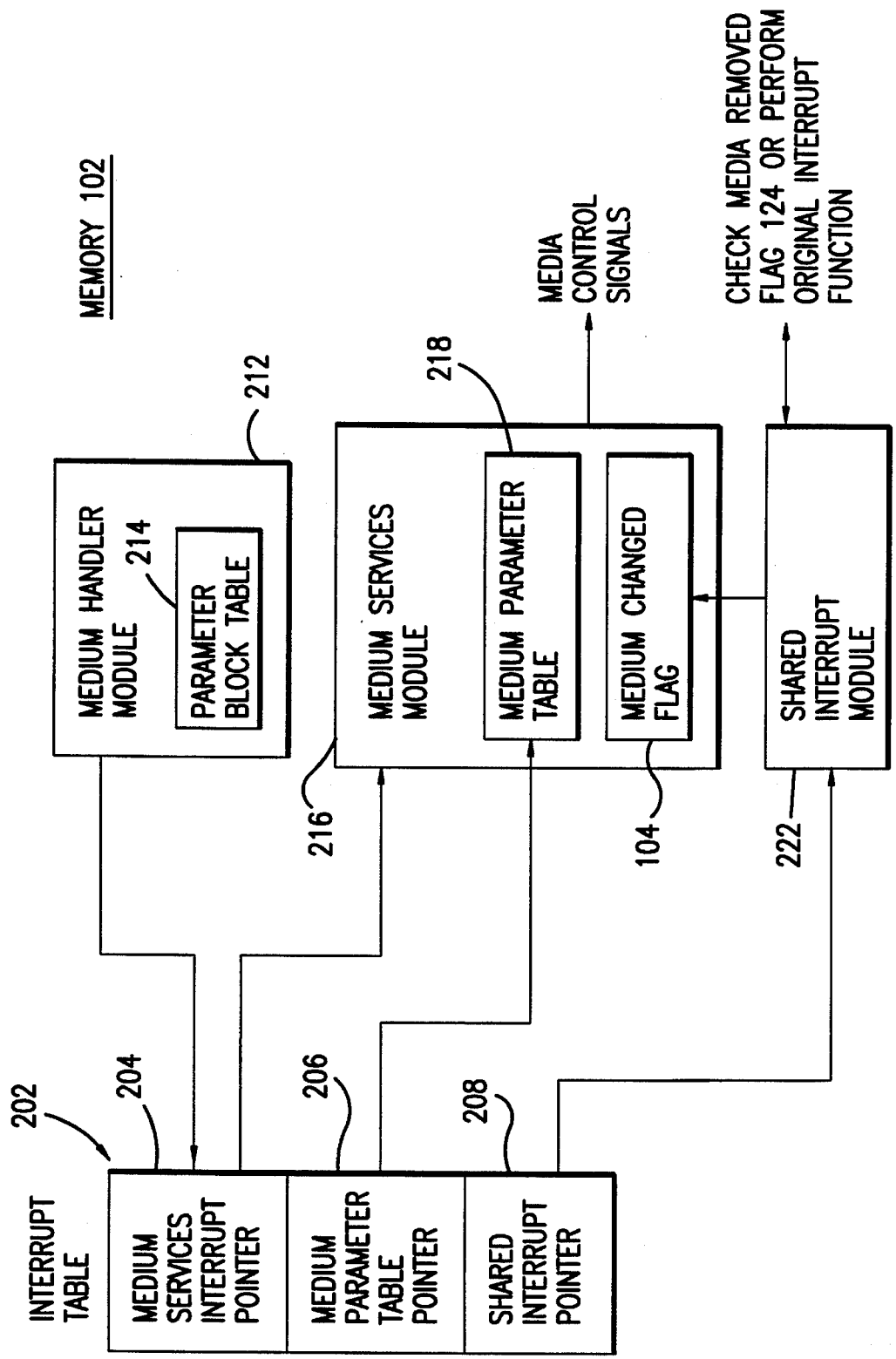
FIG. 2 is a high-level block diagram of embodiments of modules and pointers contemplated by embodiments of the present invention.

Referring now to FIG. 2, aspects of the present invention relating to the contents of memory 102 are shown. Specifically, embodiments of the present invention envision operating in environments where the operating system (envisioned to reside, in whole or in part, within memory 102) comprises modules having specified functions. Some embodiments of the present invention contemplate that these modules are replaced, in whole or in part, by modules which are part of the present invention. Other embodiments contemplate that the modules of the present invention are inherently part of the operating system, and thus no replacement is necessary. These modules are shown in FIG. 2 as modules 212, 216 and 222.

In those embodiments where the modules of the present invention replace at least some aspect of an existing operating system, certain pointers are redirected from portions of the original operating system to the modules of the present invention. Embodiments of the present invention contemplate that this is accomplished by redirecting pointers within an interrupt table 202.

Some embodiments of the present invention contemplate that the pointers of the interrupt table 202 can be re-configured to point to the modules of the present invention when the operating system is first initialized or even thereafter. In those embodiments that contemplate that the modules of the present invention are an inherent part of the operating system, no reconfiguring is required.

The modules contemplated for use by embodiments of the present invention are now described below. A medium handler module 212 acts as a high-level interface for application programs desiring to perform media operations. Consequently, when an application program (not shown) desires to effect a media operation, it communicates with the medium handler module 212.

As shown from FIG. 2, the medium handler module 212 contains a parameter block table 214 containing parameter information relating to the "last known" parameters of removable storage medium 136. That is, the parameter information in parameter block table 214 represents information from the removable storage medium 136 as of the last media operation. If the removable storage medium 136 has since been replaced with another removable medium, then the parameter information in parameter block table 214 might not be current and must be updated.

Embodiments of the present invention contemplate that the medium handler module 212 contains facilities to update the parameter information in the parameter block table 214 by providing a type of "media check" (or the like) facility as discussed in the Background section above. This facility determines whether a removable medium has been changed since the last media operation. However, unlike conventional media check commands, the facility implemented by the present invention can be utilized for media other than floppy disks (e.g., hard disks, optical disks, or the like as mentioned above) and may or may not be in "command" form (i.e., it may be implemented automatically when any media operation is requested).

In addition to performing a media check, embodiments of the present invention also contemplate that the medium handler module 212 contains a type of "build bios parameter block" facility (or the like) as discussed in the Background section above. More specifically, it is envisioned that when a determination is made that the removable storage medium 136 has been changed since the last media operation, this facility obtains new parameter information from the removable storage medium 136 and updates the information in the parameter block table 214.

In essence, when the medium handler module 212 receives a request from an application program for a media operation, it first determines whether removable storage medium 136 has been changed since the last media operation occurred. Embodiments of the present invention contemplate that the medium handler module 212 makes this determination (via, e.g., its media-check facility) by executing a medium services interrupt. Such an interrupt is contemplated to be a part of the protocol of the operating environment within which the present invention functions.

Upon execution of the medium services interrupt, embodiments of the present invention envision that a medium services interrupt pointer 204 within an interrupt table 202 is accessed and whatever module is pointed to by the medium services interrupt pointer 204 is executed. Some of these embodiments contemplate that this medium services interrupt pointer 204 points to a medium services module 216 which is contemplated to provide (either itself or in conjunction with other modules, not shown) lower-level functions to facilitate media operations.

Embodiments of the present invention contemplate that the medium changed flag 104 discussed above is part of (or at least in communication with) the medium services module 216. Consequently, when a media operation is requested, the medium services module 216 examines the medium changed flag 104 to determine whether the removable storage medium 136 has been removed (and presumably replaced) since the last media operation was performed.

If the medium changed flag 104 has not been set, then media control signals are sent to the removable media storage mechanism to perform the requested media operation. If, however, the medium changed flag 104 has been set, then media control signals are sent to the removable media storage mechanism for the purpose of examining the removable storage medium 136 to obtain new parameter information. The new parameter information is used to update the parameter block table 214 (as discussed above) as well as to update a medium parameter table 218 located within the medium services module 216. The medium parameter table 218 also contains parameter information relating to the removable storage medium 136.

Once the appropriate parameter information is updated, media control signals are sent to the removable media storage mechanism and the requested media operation is performed.

Prior to transmitting the media control signals, some embodiments of the present invention contemplate use in environments where the designation of a removable media storage mechanism is a number but the medium services module 216 recognizes the removable media storage mechanism as a letter. In this situation, some conversion must first be performed. This conversion is known as a logical to physical conversion and is contemplated to be accomplished by the medium services module 216.

Embodiments of the present invention contemplate functioning in environments where an application program has the ability to the medium handler module 212 and send requests for media operations directly to the medium services module 216. This would be accomplished by the application program executes a medium services interrupt directly.

For environments utilized by embodiments of the present invention where the application program executes a medium services interrupt, the medium parameter table 218 (which, embodiments of the present invention contemplate is pointed to and accessible via a medium parameter table pointer 206) does contain some information regarding the removable storage medium 136. However, additional information may be required by the application program in order to perform this function. Specifically, it is contemplated that the medium parameter table 718 only contains physical information about the removable storage medium 136 (e.g., number of cylinders, etc.). The parameter block table 214, however, also includes management information (e.g., directory structure, etc.).

The way that the modules of the present invention appropriately set the medium changed flag 104 is now described. When a shared interrupt is generated as previously described with regard to FIG. 1B, a shared interrupt pointer 208 is accessed to determine the location of the appropriate module to be executed. Embodiments of the present invention contemplate that the shared interrupt pointer 208 is configured (or re-configured) to point to a shared interrupt module 222.

Upon its execution, shared interrupt module 222 determines whether media removed flag 124 (see FIG. 1B) is set, thus indicating that the removable storage medium 136 has been removed. Embodiments of the present invention contemplate that shared interrupt module 222 accomplishes this by transmitting a signal to data toggle 120 at some location or "port address", allowing data within media removed flag 124 to be accessed. It is envisioned that this address is "shared" with some pre-existing mechanism whose address is part of the established protocol in use by the environment in which the present invention is utilized. Thus, like the address at which media removed flag 124 resides, the address of the data toggle 120 is also "shared." Embodiments of the present invention further contemplate that this shared address is designated as read-only by the protocol so that the data toggle 120 can receive the signal without the signal interfering with the pre-existing mechanism whose address is being shared.

Once the data toggle 120 is set to allow access to the media removed flag 124, the shared interrupt module 222 examines the media removed flag 124 to determine whether the removable storage medium 136 was removed. If the information read from the medium removed flag 124 indicates that the removable storage medium 136 has been removed, the shared interrupt module 222 sets the medium changed flag 104. In this way, when a media operation is requested, all that needs to be accessed by medium services module 216 to determine whether the removable storage medium 136 was removed is the medium changed flag 104 located in memory 102.

If the shared interrupt module 222 determines from removed medium flag 124 that the removable storage medium 136 has not been removed since the last media operation, then the medium changed flag 104 will not be set. Instead, the original interrupt function will be performed.

It should be understood that the various modules and pointers described by FIG. 2 represent various embodiments of the present invention, but that the present invention contemplates other embodiments in which other combinations and organizations of such modules and pointers are contemplated. The present invention also contemplates that these various modules and pointers can reside (in whole or in part) on storage devices other than memory 102 (i.e., on some computer-readable medium such as, but not limited to, some type of magnetic or optical disk device which can store computer program logic). Further, the present invention contemplates environments where pointers other than those relating to interrupts and interrupt-type schemes can be used to access the modules of the present invention. Such other types of environments might include, for example, one where polling rather than interrupts are involved. In general, any scheme where signals are transmitted to indicate the transactions and perform the functions mentioned above is contemplated.

It should also be understood that various features discussed as being contemplated by embodiments of the present invention are further contemplated as being a part of the environment contemplated for use with the present invention, and vise versa.

As indicated above, some embodiments of the present invention contemplate that the modules discussed above with regard to FIG. 2 are added to an existing operating system environment. This facilitates flexibility since it allows the present invention to function with existing operating systems. To implement the addition of these modules, though, embodiments of the present invention envision that an initialization procedure must first take place. This procedure is now described with regard to FIG. 3.

Figure 3:
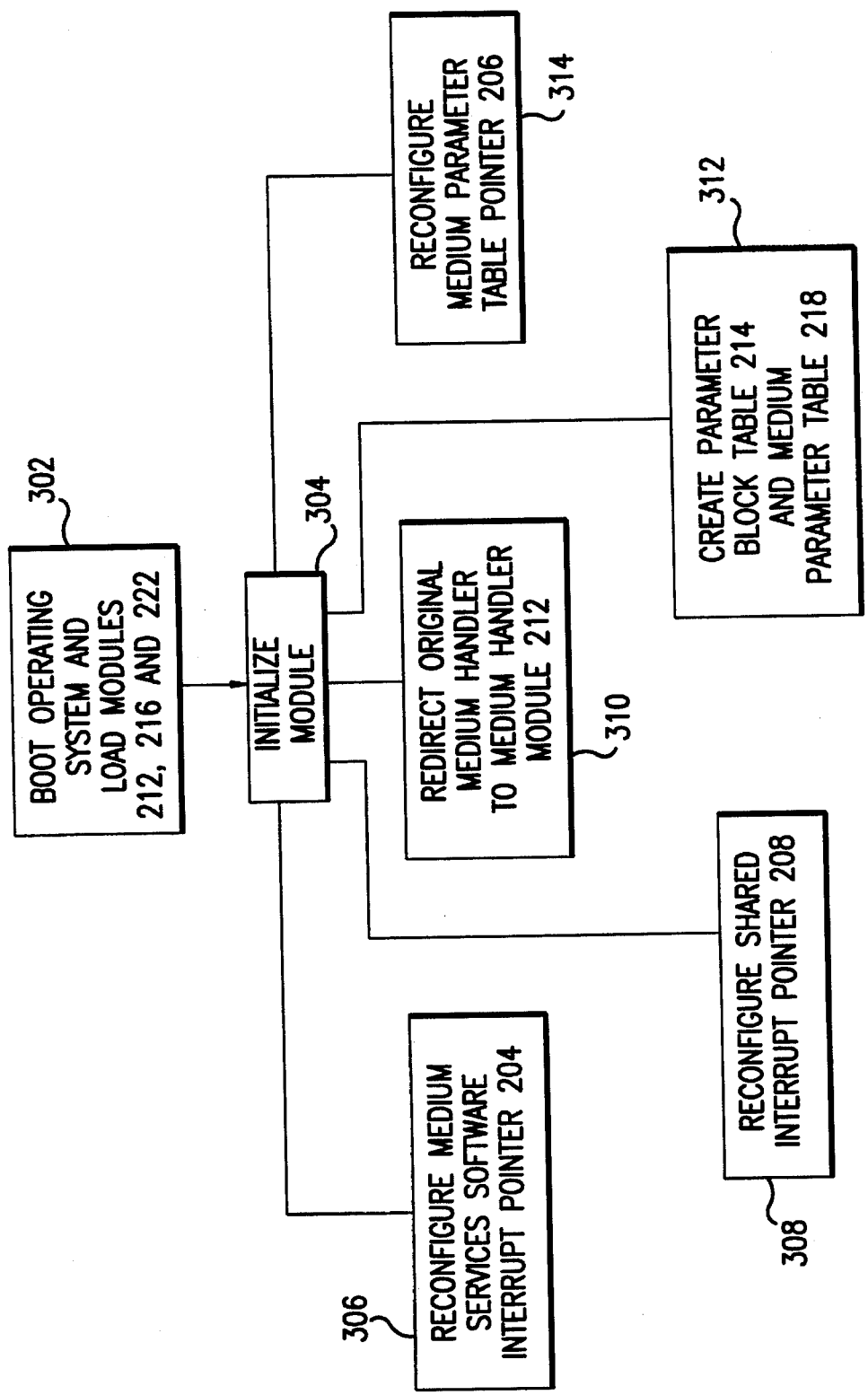
FIG. 3 is a high-level block diagram depicting the initialization of various modules and pointers as contemplated by embodiments of the present invention.

Referring now to FIG. 3, the first step is to boot the operating system (contemplated for use with these embodiments of the present invention) and load modules 212, 216 and 222 into memory 102. In addition, it is contemplated that an initialize module 304 is used to tie together these modules with the operating system environment in which the present invention operates. The functions performed by the initialize module 304 are depicted by the blocks shown attached beneath that module 304 in FIG. 3 and described below.

One of the functions of the initialization module 304 is to reconfigure the medium services software interrupt pointer 204 so that it points to the medium services module 216 of the present invention (as opposed to any previous medium services module that the initial operating system may have provided). This is indicated by a block 306. Also, the shared interrupt pointer 208 is reconfigured so that it points to shared interrupt module 222. This is indicated by a block 308. Further, the medium parameter table pointer 206 is reconfigured so that it points to the medium parameter table 218 within medium services module 216. This is indicated by a block 314.

In addition to reconfiguring the various interrupt pointers within interrupt table 202, the pointer to the original medium handler (provided by the operating system) is redirected to the new medium handler module 212. This is indicated by a block 310. Also, the removable storage medium 136 is accessed to create the parameter block table 214 and medium parameter table 218 within the medium handler module 212 and medium services module 216, respectively. This is indicated by a block 312.

In order to implement the various schemes discussed above, it is assumed that the operating system used in conjunction with the present invention utilizes some form of interrupt scheme and some form of medium handler. However, it should be emphasized that embodiments of the present invention contemplate various modifications to enable them to work with other operating systems using other types of schemes.

Figure 4:
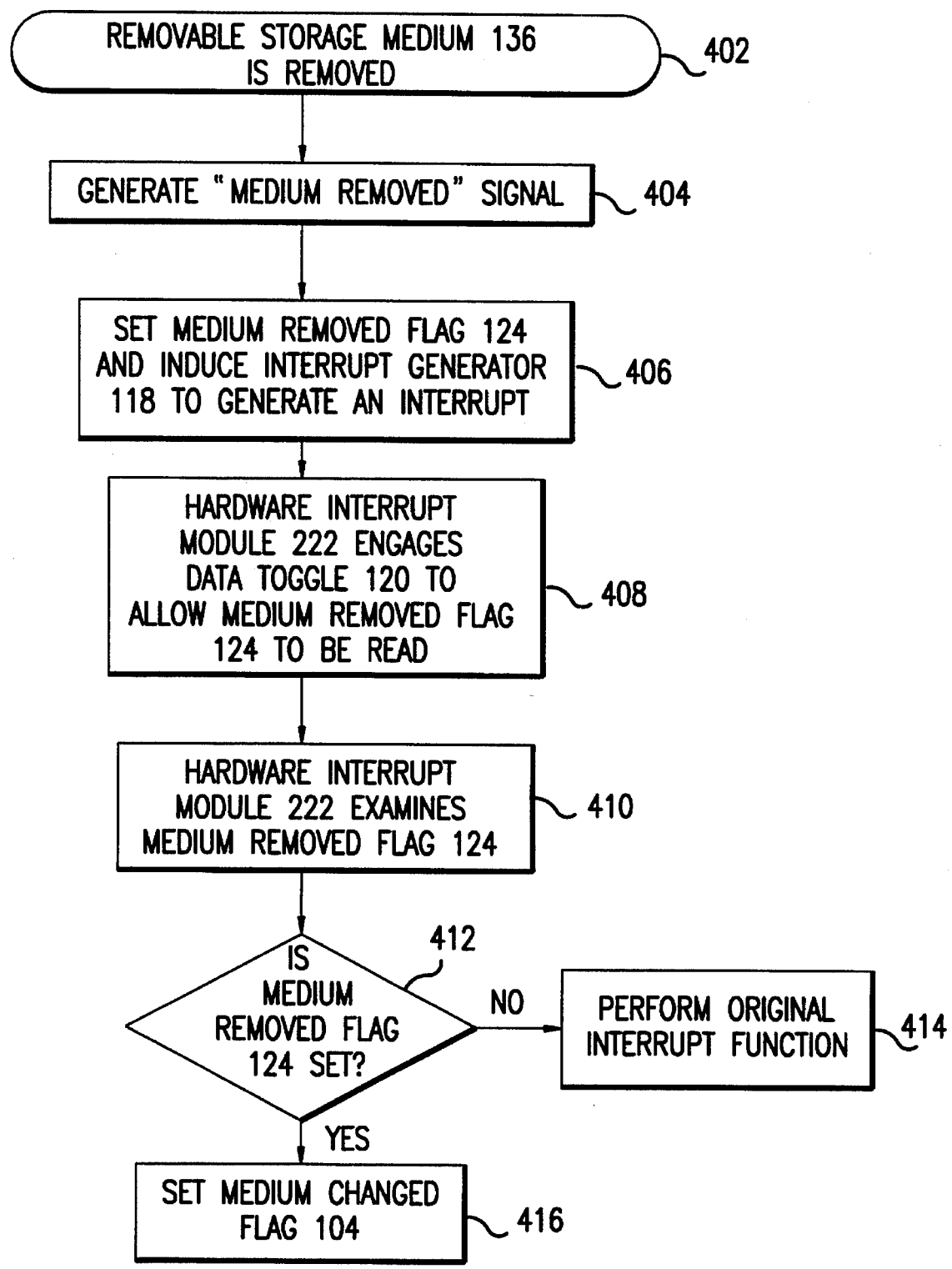
FIG. 4 is a high-level flow diagram of a method contemplated by embodiments of the present invention concerning the detection of the removal of a removable storage medium.

Embodiments of a method of operation of the present invention concerning detection of the removal of removable storage medium 136 are now described using the flow chart of FIG. 4. Referring now to FIG. 4, the event which begins the sequence shown in this Figure is the removal of removable storage medium 136. This is indicated by a block 402. When this event occurs, a "medium removed" signal is generated, as indicated by a block 404.

Upon receipt of the medium removed signal, the medium removed flag 124 is set and interrupt generator 118 is induced to generate an interrupt. This is indicated by a block 406. Hardware interrupt module 222 then engages data toggle 120 to allow the medium removed flag 124 to be read. This is indicated by a block 408. The hardware interrupt module 222 then examines the medium removed flag 124 to determine whether the removable storage medium 136 has been removed (or whether the interrupt was a result of some other event designated by the protocol of the environment in which the present invention operates). This is indicated by a block 410.

If the medium removed flag 124 has been set, then the medium changed flag 104 is also set. This is indicated by a decision block 412 and a block 416. If, however, the medium removed flag 124 has not been set, then the original interrupt function is performed, as indicated by a block 414.

Figure 5:
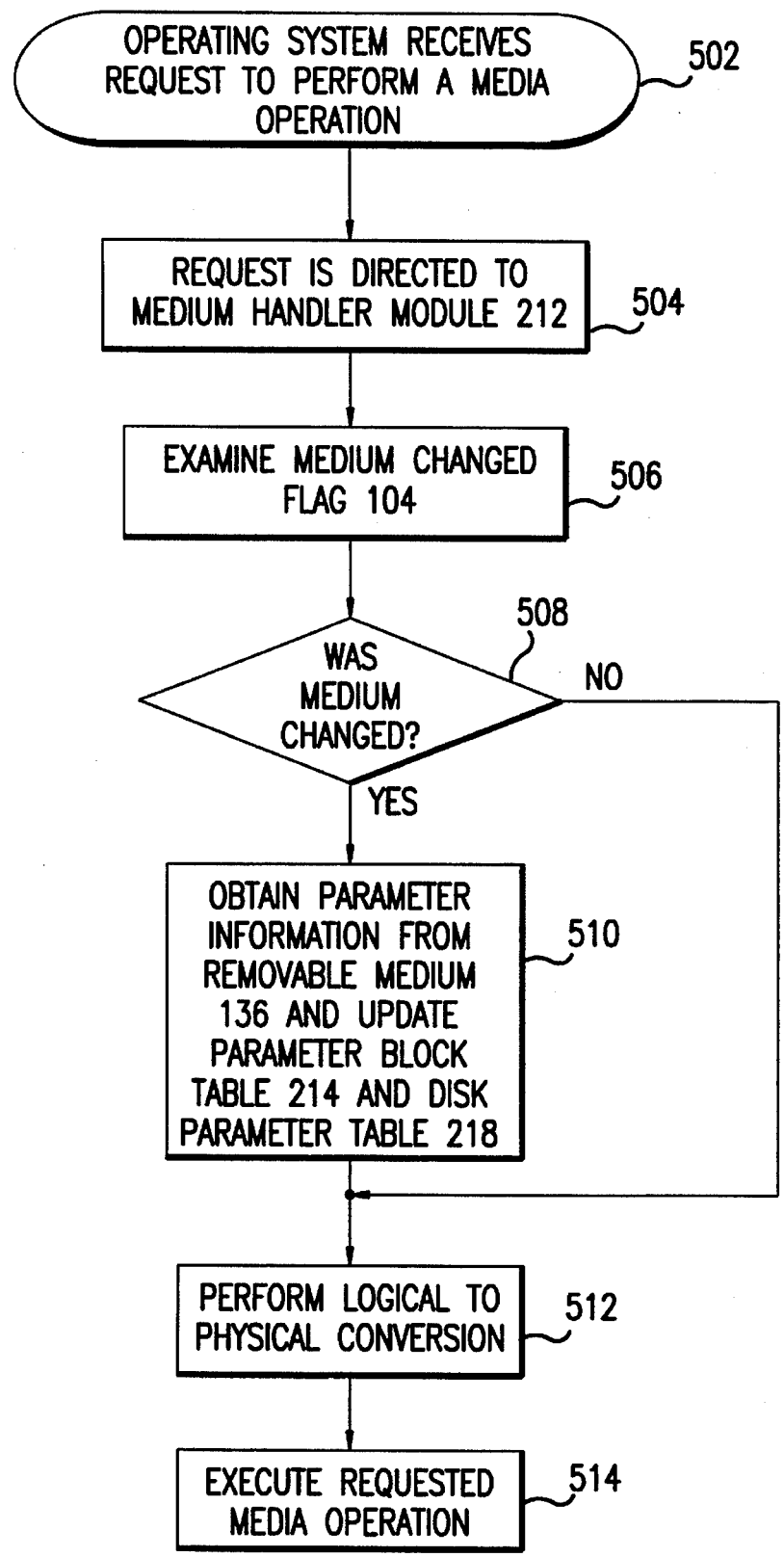
FIG. 5 is a high-level flow diagram of a method contemplated by embodiments of the present invention concerning the receipt of a media operation and the execution thereof.

Embodiments of a method of operation of the present invention concerning receipt a request for a media operation is now described with regard to the flow chart of FIG. 5. Referring now to FIG. 5, the event which begins the sequence shown by this flow chart is when the operating system receives a request for a media operation as indicated by a block 502. This request is directed to medium handler module 212 as indicated by a block 504. The medium changed flag 104 is examined to determine whether the removable storage medium 136 has been changed since the previous media operation. This is indicated by a block 506.

If it is determined that the removable storage medium 136 has been changed, then parameter information is obtained from the new removable storage medium 136 and the parameter block table 214 and disk parameter table 218 are updated. This is indicated by a decision block 508 and a block 510. If it is determined that the medium has not been changed, then the operation indicated by block 510 is not executed.

The next step is to prepare for execution of the requested media operation by performing a logical to physical conversion. This is indicated by a block 512. Then, the requested media operation is executed, as indicated by a block 514.

Lower-level Embodiments Of The Present Invention

Figure 6:
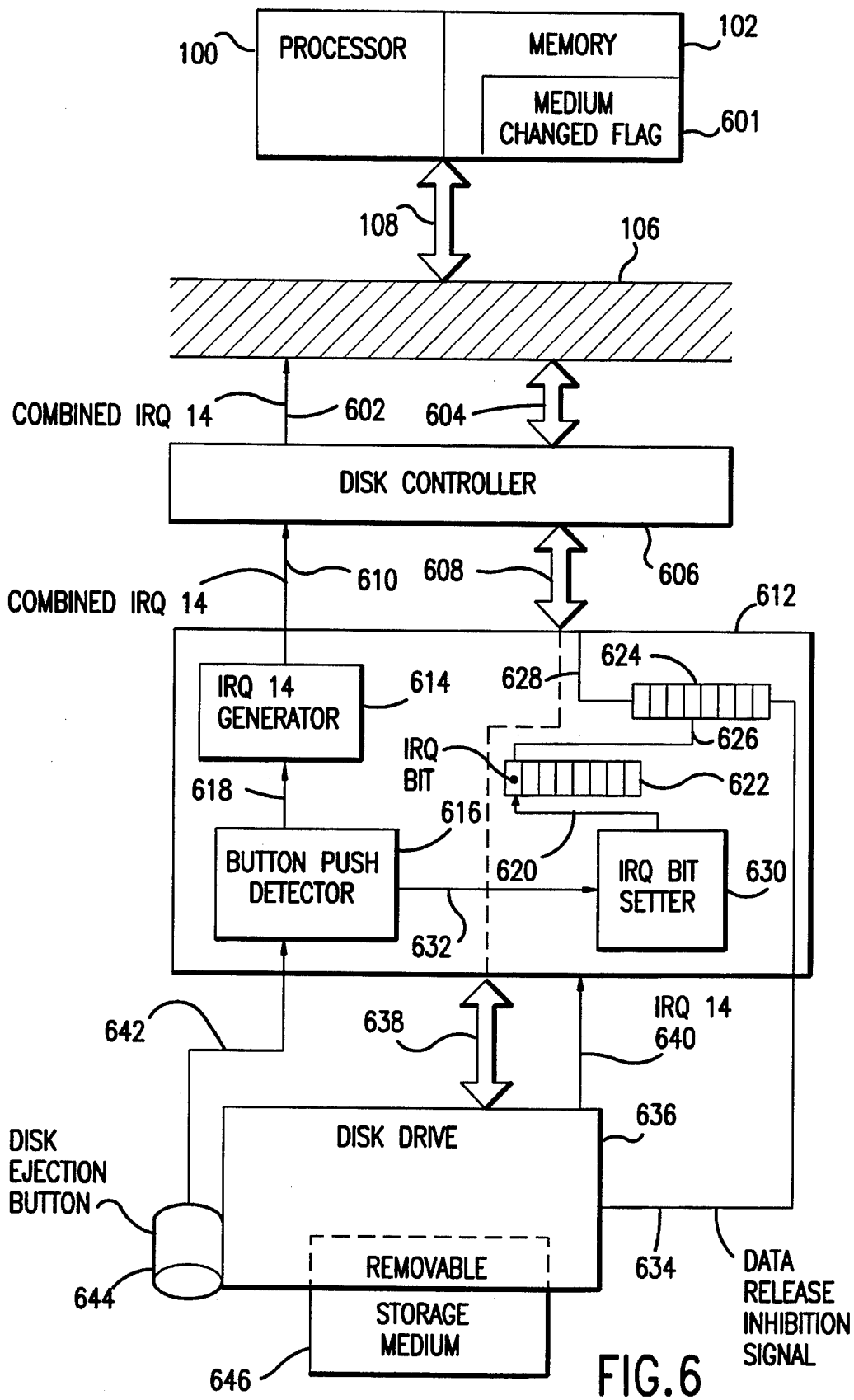
FIG. 6 is a block diagram of a computer environment with a removable storage medium mechanism having components contemplated by various embodiments of the present invention.

Embodiments of the present invention which contemplate the use of specified components are now described with regard to FIG. 6. In particular, FIG. 6 contemplates that the removable medium is a magnetic or optical disk.

Referring now to FIG. 6, a removable medium 646 is shown within disk drive 636. A disk ejection button 644 is used to eject the removable medium 646. This is the type of mechanism commonly found in such removable media storage mechanisms as IDE drives.

The "shared interrupt" contemplated for use by various embodiments of the present invention is hardware interrupt IRQ 14. This is an interrupt recognized by the Intel brand of microprocessors (Intel is a corporation of Santa Clara, Calif.). According to the protocol used in conjunction with these Intel microprocessors, IRQ 14 is generated when the removable medium 646 is "ready" (i.e., when the removable medium 646 is in a position to read or write data in response to a request from the operating system). Of course, other hardware interrupts could have been used and this particular one is specific to Intel microprocessors.

When the disk ejection button 644 is activated, a disk removed signal is sent along signal line 642 to a button push detector 616 within a detection controller 612. When the button push detector 616 is activated by this signal, a signal is sent to an IRQ bit setter 630 via signal line 632. This, in turn, sets an IRQ bit within a detection register 622. Embodiments of the present invention contemplated for use where IDE disk drives are involved envision that the detection register 622 is accessible via port 1F0h and that the address of this port is shared with a pre-existing mechanism (e.g., a register). Of course, other port addresses could be used and, depending upon the disk drive scheme contemplated for use, different port addresses may need to be used to accommodate the protocol of that scheme.

The button push detector 616 also activates an IRQ 14 generator 614 via a signal line 618. The hardware interrupt (IRQ 14) is then sent to disk controller 606 via a signal line 610. Note that the interrupt transmitted along signal line 610 is termed "combined IRQ 14," indicating that the present invention is sharing IRQ 14. Thus, the generation of an IRQ 14 can indicate either that the removable medium 646 has been removed or that the disk is "ready." Thus, when disk controller 606 receives an IRQ 14 via signal line 610 it is unable to tell, at that point, whether the IRQ 14 was caused as a result of the removable medium 646 being removed or as a result of the removable medium 646 being "ready."

After receipt by the disk controller 606, the combined IRQ 14 signal is then transmitted from the disk controller 606 to the bus 106 and onto processor 100 via signal line 108.

Upon receipt of combined IRQ 14, the present invention reads the data in detection register 622. Specifically, the present invention determines whether the IRQ bit is set, indicating that the removable medium 646 has been removed since the last disk operation.

In order to read the information at detection register 622, the pre-existing mechanism which is at that shared address must first be disabled. For example, in those embodiments contemplated for use with IDE disk drives, address 1F0h is associated with a register located within disk drive 636. Thus, this register must first be disabled so that detection register 622, which is also at address 1F0h, can be accessed.

Embodiments of the present invention envision that detection register 622 is accessed by sending specified data to a data toggle 624, which is a register. In embodiments contemplated for use with IDE drives where the address is shared with a register on the disk drive 636, it is envisioned that a data release inhibitor signal is sent along a signal line 634 to disk drive 636 to disable any data which would otherwise be read from the pre-existing mechanism. (In other embodiments, the pre-existing mechanism is also, in some way, disabled.) At the same time, detection register 622 is enabled so that data read at that address is read from detection register 622. Some embodiments of the present invention contemplate that the address of data toggle 624 is 3F7h, which corresponds to an appropriate address utilized by the IDE protocol.

Once data is read from detection register 622 and used to determine whether a medium changed flag 601 in memory 102 should be set, data is written to data toggle 624 to re-enable the pre-existing mechanism and to disable access to detection register 622. If the data from detection register 622 indicated that the removable medium 646 has been removed, the medium changed flag 601 is then set. Some embodiments of the present invention contemplate that the setting of medium changed flag 601 causes the motor (not shown) in disk drive 636 to deactivate.

From FIG. 6, signal lines 638, 608 and 644 are indicated separately from lines 640, 610 and 602, respectively. However, it should be understood that some embodiments of the present invention contemplate that such separation does not occur.

Various embodiments of the modules of the present invention discussed above are now described with regard to FIG. 7. The embodiments shown in this Figure relate to use with the MS-DOS operating system. However, embodiments of the present invention contemplate that other operating systems can also be used, including OS/2 from IBM of Armonk, N.Y. and any of the various versions of the UNIX operating system.

Figure 7:
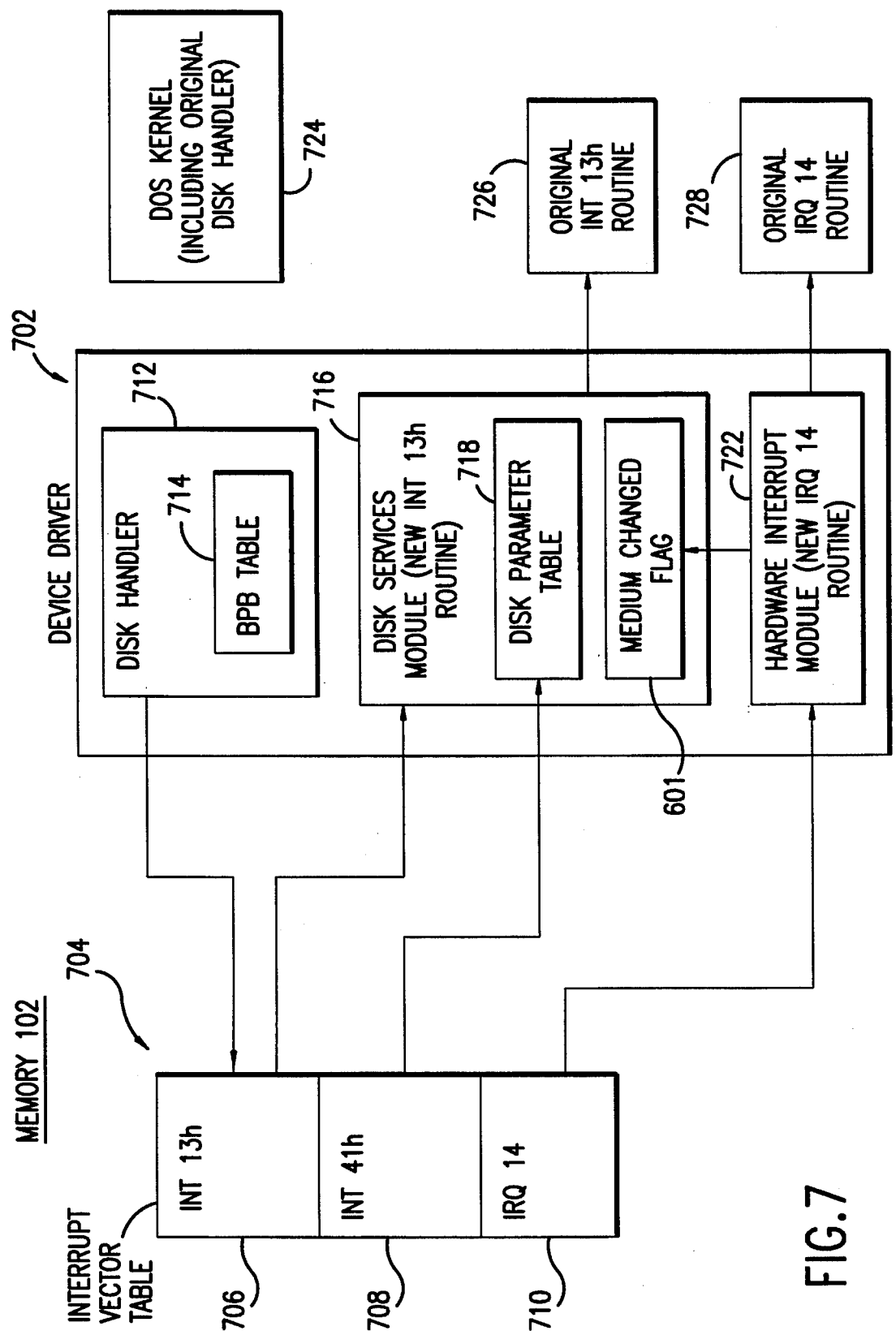
FIG. 7 is a block diagram of embodiments of modules and pointers contemplated by embodiments of the present invention.

Referring now to FIG. 7, a device driver 702 is shown loaded into memory 102. A disk handler 712, containing a BIOS Parameter Block (BPB) table 714, is depicted as replacing the original disk handler within the DOS kernel 724 (which is a part of the MS-DOS operating system). When an application program (not shown) requests a disk operation, the disk handler 712 is called and a media check command is executed. The disk handler 712, in turn, executes interrupt 13h, which is the interrupt used by MS-DOS to service disk operations.

In an interrupt vector table 704, a pointer for interrupt 13h (INT 13) (706) points to a disk services module 716. Thus, when INT 13 is executed, disk services module 716 is pointed to for execution rather than original INT 13 routine 726.

When executed, the disk services module 716 examines the medium changed flag 601 to determine whether the disk has been changed since the last disk operation. If it has been changed, then the disk services module 716 reads parameter information from the removable medium 646 and updates the BPB table 714 and a disk parameter table 718. After this updating is completed, the original INT 13h routine 726 is executed to perform the requested disk operation. If the medium changed flag 601 has not been set, however, then the tables 714 and 718 will not be updated and the original INT 13h routine 726 is executed.

Some embodiments of the present invention contemplate that original INT 13h routine 726 is incorporated into disk services module 716 and somewhat modified. This modification is to prevent a "disk failure" during boot-up or "disk test" if there is more than one removable media storage mechanism in the computer system and one of these does not contain a removable medium 646 in the disk drive 636. Such a "disk failure" would otherwise occur in those circumstances in some environments contemplated for use with the present invention.

Embodiments of the present invention have been configured to function when INT 13h is executed directly by an application program. As discussed above regarding FIG. 2, only the information from the disk parameter table 718 is available (i.e., the BPB table is unavailable) and thus additional work is required by the application program. Also, a pointer at INT 41h (which has been reconfigured to point to disk parameter table 718) of interrupt vector table 704 must be obtained to determine the location of the disk parameter table 718. Embodiments of the present invention contemplate that the disk handler 712 automatically obtains this pointer. In some embodiments of the present invention contemplating that more than one removable storage medium 646 is used, INT 46h is also utilized and would point to a second disk parameter table (not shown).

A mechanism contemplated by embodiments of the present invention for setting the medium changed flag 601 is now described. Upon receipt of hardware interrupt IRQ 14, hardware interrupt module 722 is executed. This is because an IRQ 14 pointer 710 is configured to point to this module 722.

The hardware interrupt module 722 examines the detection register 622 to determine whether the IRQ 14 was generated as a result of a "disk ready" signal or as a result of the removable medium 646 being removed. If it is the latter, then the medium changed flag 601 is set. If it is the former, then the original IRQ 14 routine 728 is executed so that the original function can be performed in accordance with protocol.

Figure 8:
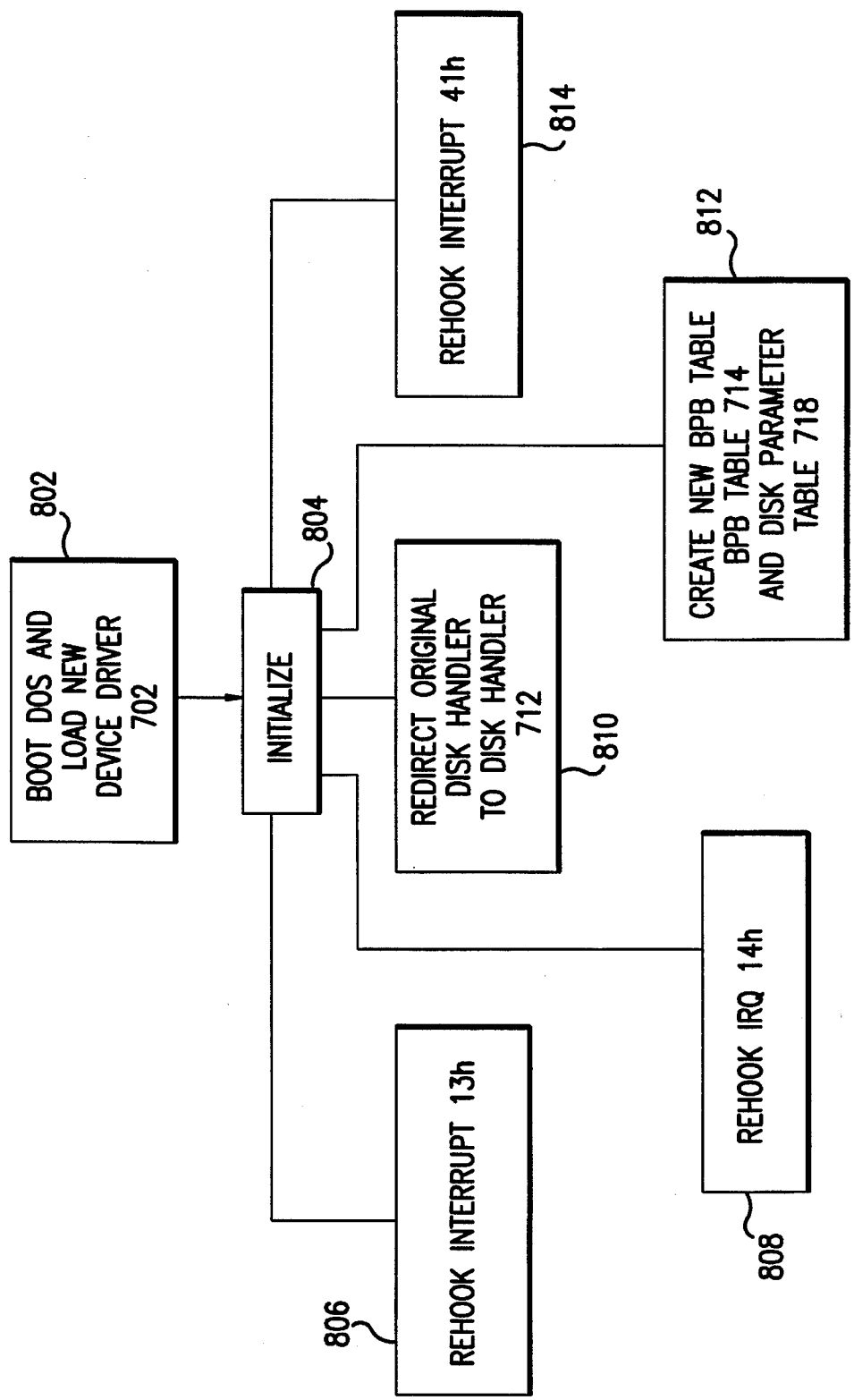
FIG. 8 is a block diagram depicting the initialization of various modules and pointers as contemplated by embodiments of the present invention.

The initialization of some of the above-mentioned embodiments of the present invention is now described with regard to FIG. 8. Referring to FIG. 8, the first step is that the operating system is booted and the device driver 702 is loaded into memory. This is indicated by a block 802. Then, various aspects of the present invention are initialized, as indicated by a block 804.

One part of the initialization scheme includes re-hooking INT 13h. That is, the INT 13h pointer 706 is changed from pointing to original interrupt 13h routine 726 to pointing to the disk services module 716. This is shown by a block 806. The IRQ 14 pointer 710 is also re-hooked to point to hardware interrupt module 722 (shown by a block 808) and an INT 41h pointer 708 is re-hooked to point to the disk parameter table 718 within disk services module 716 (shown by a block 814).

Also accomplished during this initialization scheme is that access to the original disk handler within DOS kernel 724 is redirected to disk handler 712 within device driver 702 (shown by a block 810) and a new BPB table 714 and disk parameter table 718 are created (shown by a block 812).

Figure 9A:
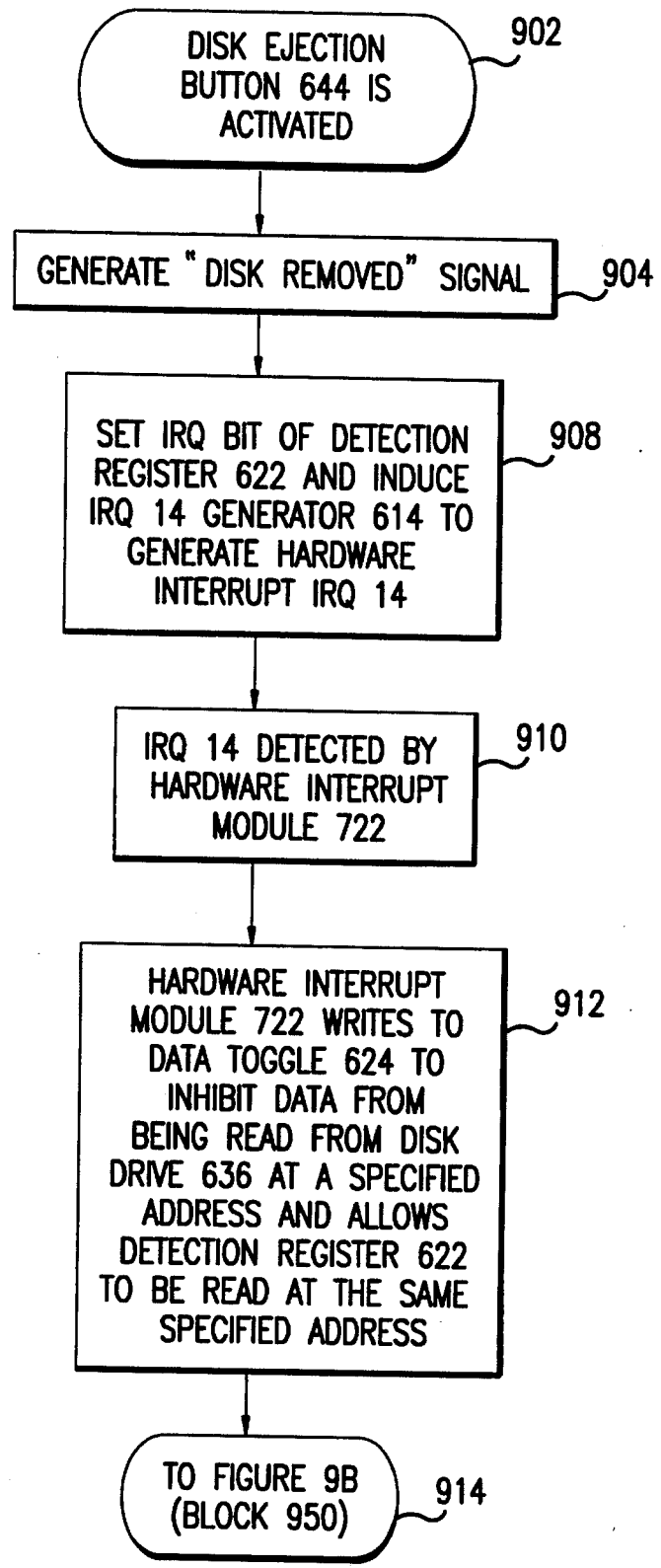
FIGS. 9A and 9B are a flow diagram of a method contemplated by embodiments of the present invention concerning the detection of the removal of a removable storage medium.
Figure 9B:
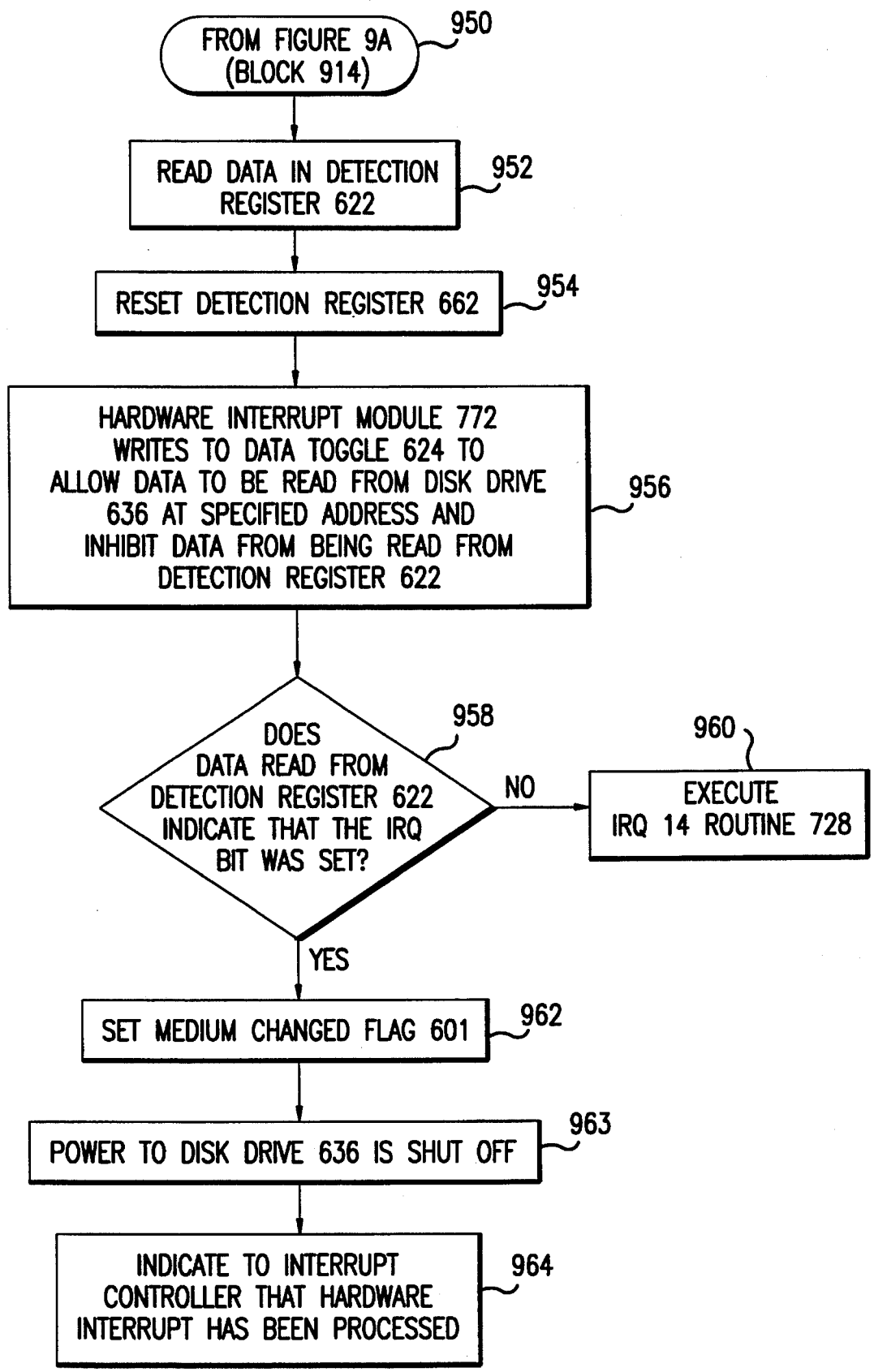
Figure 10:
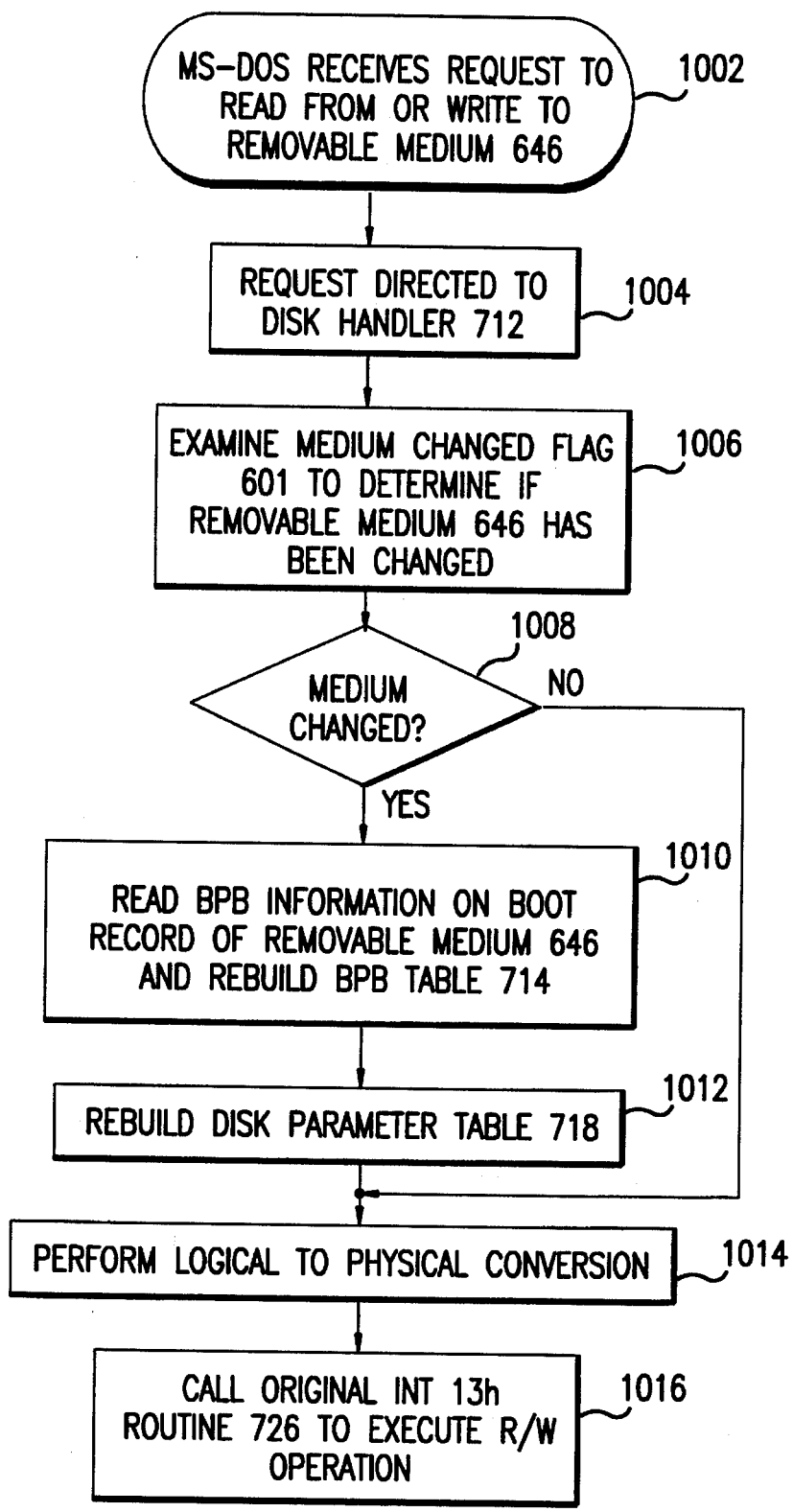
FIG. 10 is a flow diagram of a method contemplated by embodiments of the present invention concerning the receipt of a media operation and the execution thereof.

A method of operation of the present invention is now discussed with regard to FIGS. 9A, 9B and 10. Referring first to FIG. 9A, this and FIG. 9B describe the method utilized by embodiments of the present invention to set medium changed flag 601 when the removable medium 646 is removed. First, the activation of the disk ejection button 644 begins the process, as indicated by a block 902. This then generates a "disk removed" signal, as indicated by a block 904.

The next step is that the IRQ bit of detection register 622 is set and the IRQ 14 generator 614 is induced to generate hardware interrupt IRQ 14. This is indicated by a block 908. Then, IRQ 14 is detected by hardware interrupt module 722 (as a result of IRQ 14 pointer 710 in interrupt vector table 704) as indicated by a block 910.

Upon detection of this hardware interrupt, the hardware interrupt module 722 writes specified data to data toggle 624 in order to inhibit data from being read from disk drive 636 at the shared specified address. Activation of the data toggle 624 also allows detection register 622 to be read at this specified shared address. This is indicated by a block 912.

The next step, shown at FIG. 9B, is to read the data (which includes the IRQ bit) within the detection register 622. This is indicated by a block 952. The detection register 622 is then reset as indicated by a block 954.

The hardware interrupt module 722 then writes to data toggle 624 to once again allow data to be read from the disk drive 636 at the specified shared address and also to inhibit the data from being read from the detection register 622. This is indicated by a block 956.

If the data from the detection register 622 indicates that the IRQ bit was set and thus that the removable medium 646 had been removed since the last disk operation, then the medium changed flag 601 is set, as indicated by a decision block 958 and a block 962. Embodiments of the present invention also contemplate that the power to the disk drive 636 is shut off, as indicated by a block 963.

The next step is to indicate to an interrupt controller (that is, that mechanism, not shown, that controls the functioning of interrupts) that the hardware interrupt has been processed. This is indicated by a block 964.

If, however, the IRQ bit was not set, then the hardware interrupt was not caused because of removal of the removable medium 646. In that case, the original IRQ 14 routine 728 is be executed, as indicated by a block 960.

FIG. 10 describes the operation contemplated by embodiments of the present invention upon receipt of a request for a read or write operation. Referring now to FIG. 10, the event which begins this operation is when MS-DOS receives a request to read from or write to removable medium 646. This is indicated by a block 1002. This request is directed to the disk handler 712 as indicated by a block 1004.

The next step is that the medium changed flag 601 is examined in order to determine whether the removable medium 646 has been changed since the last disk operation. Embodiments of the present invention, as indicated above, contemplate using a media check command (as part of the disk handler 712) to make this determination. This command, in turn, calls INT 13h. This is indicated by a block 1006.

If the medium has been changed, then BPB information from the boot record of the newly inserted removable medium 646 is read to rebuild the BPB table to account for the new parameter information on the removable medium 646. Also, the disk parameter table 718 is rebuilt, also using information from the boot record of the removable medium 646. All this is indicated by a decision block 1008 and blocks 1010 and 1012.

If the removable medium 646 has not been changed, then the steps indicated at blocks 1010 and 1012 are skipped. Then, in either case, a logical to physical conversion is performed, as indicated by a block 1014. The original INT 13h routine 726 is then executed in order to perform the requested read or write operation, as indicated by a block 1016.

It should be understood that the "signal" lines or other lines discussed above represent a path of communication between the various components of embodiments of the present invention. Consequently, it should be understood that these paths do not necessarily represent a direct connection between the components that these lines link and that embodiments of the present invention contemplate various configurations. Also, it should be understood that although the present invention was discussed using a single removable media storage mechanism, any number of such storage mechanisms could be used.

Embodiments of the present invention contemplate operation in a computer system environment which uses, for example, one of the Intel line of processors, including the Intel 8086, 8088, 80286, 80386, 80486 and any other Intel or Intel-compatible processors. Of course, computer systems having other processors are also contemplated, as are computer systems using multiple processors. Also, the modules discussed above are envisioned to be written in the assembly language of the processor used with the present invention. Of course, higher-level languages such as C could also be used.

It should be emphasized that the various components of embodiments of the present invention can be implemented in hardware, software or a combination thereof. In such embodiments, the various components and steps would be implemented in hardware and/or software to perform the functions of the present invention. Any presently available or future developed computer software language and/or hardware components can be employed in such embodiments of the present invention.

It should also be understood that the present invention is not limited to the embodiments indicated above, and that the examples presented above are merely for the purposes of illustration. The scope of the present invention should therefore be interpreted by the following claims as defined by the forgoing figures and text.

What is claimed is:

1. A system for detecting the removal of a first removable storage medium from a removable medium receptacle and for permitting media operations to be performed on a second removable storage medium substituted for the first removable storage medium, comprising:

signal generation means for generating a first signal upon detection of the removal of the first removable storage medium;

shared signal generation means for detecting said first signal and, in response to said detected first signal, generating a second signal representing a pre-existing signal condition, wherein said second signal is shared between indicating that the first removable storage medium has been removed and indicating the occurrence of a predefined event, determination means for receiving said second signal, and for determining whether said second signal was generated by said shared signal means or by the occurrence of said predefined event;

flag means for setting a flag in response to a determination by said determination means that said second signal was generated by said shared signal means, whereupon a set flag is created indicating that the first removable storage medium has been removed; and media control means for receiving a request to perform a media operation and for detecting said set flag to determine that the first removable storage medium has been removed;

wherein said flag was set prior to performance of said media operation.

wherein upon detection of said set flag, said media control means obtains parameter information from the second removable storage medium to enable the performance of said media operation.

2. The system of claim 1, wherein said second signal is an interrupt.

3. The system of claim 1, wherein said media control means comprises a parameter block table for containing management information of the first removable storage medium and/or second removable storage medium.

4. A removable media storage system for facilitating the storage of computer information, comprising:

a removable medium receptacle containing a first removable storage medium;

a removable medium controller for controlling said removable medium receptacle and for directing control signals and data directed to and received from said removable medium receptacle;

detection means for detecting the removal of said first removable storage medium from said removable medium receptacle and for permitting media operations to be performed on a second removable storage medium substituted for said first removable storage medium, said detection means comprising:

signal generation means for generating a first signal upon the removal of said first removable storage medium from said removable medium receptacle;

shared signal generation means for detecting said first signal and, in response to said detected first signal, generating a second signal, wherein said second signal is shared between indicating that the first removable storage medium has been removed and indicating the occurrence of a pre-defined event, determination means for receiving said second signal, and for determining whether said second signal was generated by said shared signal means or by the occurrence of said pre-defined event;

flag means for setting a flag in response to a determination by said determination means that said second signal was generated by said shared signal means, indicating that said first removable storage medium has been removed from said removable medium receptacle, wherein said flag was set prior to performance of said media operations.

5. The claim of claim 4, wherein said removable medium receptacle and said removable medium controller utilize Integrated Drive Electronics protocol.

6. The system of claim 4, wherein said second signal is an interrupt.

7. The system of claim 4, wherein said media control means comprises a parameter block table for containing management information of the first removable storage medium and/or second removable storage medium.

8. A system for detecting the removal of a first removable storage medium from a computer environment and for permitting a media operation to be performed on a second removable storage medium substituted for the first removable storage medium, the computer environment being responsive to a pre-existing signal condition recognized by the computer environment to indicate the occurrence of a pre-defined event, comprising:

a shared signal module for receiving a shared signal, wherein said shared signal is shared between indicating that the first removable storage medium has been removed and indicating the occurrence of the pre-defined event, wherein said shared signal being generated in response to the first removable storage medium being removed or in response to the occurrence of the pre-defined event, and wherein said shared signal module determines whether said shared signal was caused by the removal of the first removable storage medium or by the occurrence of the pre-defined event;

a medium changed flag for indicating that the first removable storage medium has been removed, said medium changed flag being set by said shared signal module in response to a determination that said shared signal was caused by the removal of the first removable storage medium;

a medium services module for examining said medium changed flag prior to permitting the media operation to be performed, thereby determining whether the first removable storage medium has been removed;

wherein upon a determination by said medium services module that said medium changed flag is set, obtaining parameter information from the second removable storage medium to facilitate performance of the media operation, wherein said medium changed flag was set prior to performance of the media operation; and a computer-readable medium for use with the computer environment for storing computer program logic representative of said shared signal module, said medium changed flag and said medium services module.

9. The system of claim 8, wherein said shared signal module accesses an address within the computer environment to determine whether said shared signal was caused by the removal of the first removable storage medium.

10. The system of claim 9, wherein said address is shared with a pre-existing mechanism of the computer environment.

11. The system of claim 8, wherein said shared signal is an interrupt.

12. A system, operating in a computer environment, for indicating the removal of a removable storage medium from a removable medium receptacle, comprising:

medium removed detector means for detecting a first signal generated by the removable medium receptacle upon removal of the removable storage medium;

signal generator means, responsive to said medium removed detector means, for generating a second signal, in response to said detected first signal, to communicate the removal of the removable storage medium to the computer environment;

wherein said second signal is shared between indicating that the removable storage medium has been removed and indicating the occurrence of a pre-defined event within the computer environment;

a medium removed flag, responsive to said medium removed detector means, said medium removed flag being set in response to removal of the removable storage medium; and data toggle means for selectively allowing access to said medium removed flag by the computer environment, in response to said second signal, to determine whether the removable storage medium has been removed or whether said second signal was generated by the occurrence of said pre-defined event.

13. The system of claim 12, wherein said flag means comprises a register sharing an address with a pre-existing mechanism of the computer environment.

14. In a computer environment, a method for detecting the removal of a first removable storage medium from the computer environment and for permitting a media operation to be performed on a second removable storage medium substituted for the first removable storage medium, the computer environment responsive to a predetermined signal recognized by the computer environment to indicate the occurrence of a pre-defined event, the method comprising the steps of:

(1) receiving a shared signal representing a pre-existing signal condition, wherein said shared signal is shared between indicating that the first removable storage medium has been removed and indicating the occurrence of the pre-defined event, wherein said shared signal being generated in response to the first removable storage medium being removed or in response to the occurrence of the pre-defined event;

(2) determining whether said shared signal of said step (1) was caused by the removal of the first removable storage medium or by the occurrence of said pre-defined event;

(3) setting a medium changed flag, in response to said step (2), upon determining that said shared signal was caused by the removal of the first removable storage medium;

(4) determining, in response to receipt of the media operation, whether said medium changed flag of said step (3) is set, thereby determining whether the first removable storage medium has been removed; and (5) obtaining parameter information from the second removable storage medium, when said medium changed flag is determined as set in said step (4), to facilitate performance of the media operation, wherein said medium changed flag was set prior to performance of the media operation.

15. The method of claim 14, further comprising the step after said step (5) of rebuilding a medium parameter table using said parameter information.

16. A system for detecting the removal of a first removable storage medium from a removable medium receptacle and for permitting media operations to be performed on a second removable storage medium substituted for the first removable storage medium, comprising:

signal generation means for generating an interrupt upon detection of the removal of the first removable storage medium;

flag means for receiving said interrupt and for setting a flag, whereupon a set flag is created, indicating that the first removable storage medium has been removed; and media control means for receiving a request to perform a media operation and for detecting said set flag;

wherein upon detection of said set flag, said media control means obtains parameter information from the second removable storage medium to enable the execution of said media operation.

17. A system for detecting the removal of a first removable storage medium from a removable medium receptacle and for permitting media operations to be performed on a second removable storage medium substituted for the first removable storage medium, comprising:

signal generation means for generating a first signal upon detection of the removal of the first removable storage medium;

shared signal generation means for detecting said first signal and, in response to said detected first signal, generating a second signal representing a pre-existing signal condition, wherein said second signal is shared between indicating that the first removable storage medium has been removed and indicating the occurrence of a pre-defined event, determination means for receiving said second signal, and for determining whether said second signal was generated by said shared signal means or by the occurrence of said pre-defined event;

flag means for setting a flag in response to a determination by said determination means that said second signal was generated by said shared signal means, whereupon a set flag is created indicating that the first removable storage medium has been removed, wherein said flag was set prior to performance of the media operations.

* * * * *